Patented May 31, 1949

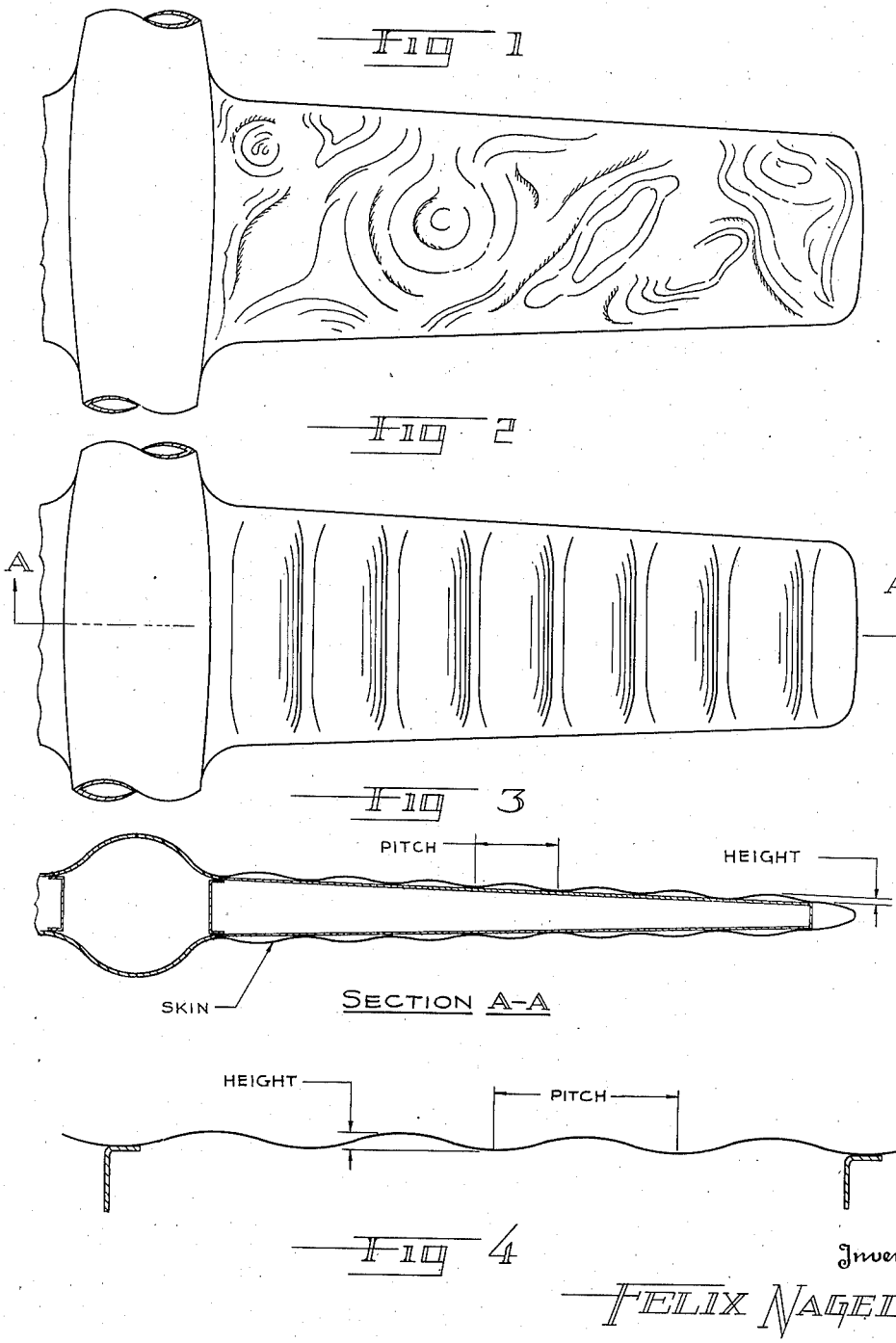

2,471,768

UNITED STATES PATENT OFFICE 2,471,768

SHEET COVERING FOR AIRCRAFT PARTS

Felix Nagel, College Park, Md., assignor to Engineering and Research Corporation, Riverdale, Md., a corporation of Maryland Application February 16, 1945, Serial No. 578,289

2 Claims. (Cl. 244—35)

The invention relates generally to aircraft constructions and, more particularly, to the external covering of aircraft parts over which air flows while the aircraft is in flight and which are of such nature that the air flow thereover must be maintained in a constant, undisturbed state.

In usual aircraft constructions flat metal sheet is used to cover the wings. It has been found that such a covering is distorted in irregular wave patterns by compressive loading of the covering and that these waves extend in directions which are angularly related to the line of flight of the aircraft. Such waves destroy the laminar air flow over the wing, increase the drag and reduce the lift of the wing.

The principal object of my invention is to provide a method of and means for preventing the formation of the angularly-disposed waves which are formed in sheet metal coverings and which method and means will permit only the formation of waves which are parallel to the line of flight and which therefore will not disturb in any way the laminar air flow over the wing.

In achieving this object it has been a further object of my invention to provide a flexible covering for a wing or other aircraft part which is so constructed that when the wing or other part is subjected to forces tending to produce the irregular or angular waves referred to only waves which are parallel to the direction of flight will be produced in the covering. As a corollary to this object, it has been an object to provide, as a new article of manufacture, a flexible covering for aircraft wings and other parts which will produce the new and advantageous result described.

Other objects and features of novelty of the invention will be made apparent by the following description and the annexed drawings which, it will be understood, are only illustrative of the invention and impose no limitation thereon not imposed by the appended claims.

Referring to the drawings, in which similar reference numerals refer to like parts.

Fig. 1 is a partial view of an airplane showing a wing having a known covering and having waves produced therein which are angularly-related to the direction of flight;

Fig. 2 is a view which is similar to Fig. 1, showing a wing having a covering formed according to the present invention and subject also to the forces tending to produce angular waves therein;

Fig. 3 is a view taken on line A—A of Fig. 2, and

Fig. 4 is an enlarged view of a small part of the upper surface of the wing, showing the covering according to my invention.

In Fig. 1 of the drawings there is illustrated an airplane wing having a flat, uncorrugated covering thereon which may be formed of aluminum or other material. Under ideal conditions of operation the flow of air across the upper and lower surfaces of this wing, from the leading edge to the trailing edge will be smooth. This condition of air flow is known as laminar flow and as it is the most advantageous condition of air flow across the wing, it is always desirable to maintain this condition. It has been found, however, that when an aircraft wing is subjected to load which cause compression of, for example, the upper wing surface, the covering of such surface buckles, temporarily forming waves or corrugations which, invariably, are not parallel to the direction of flight. Such waves or corrugations are indicated in Fig. 1. It will be apparent that such waves in the wing covering will disturb the laminar flow of air over the wing surface and it has been found that such disturbance increases the drag and reduces the lift of the wing.

This invention provides a flexible sheet covering for wing or other aircraft surfaces which is so formed that the forces which tend to produce the angularly-disposed waves are caused to produce in the covering according to the invention only waves which are parallel to the direction of flight, whereby the laminar flow of air is not disturbed.

In carrying out my invention, I provide a preferably thin flexible sheet, preferably metallic, which is formed with corrugations having a very low height which is preferably of the order of 0.1 inch and may be as low as 0.01 inch, and having a pitch-to-height ratio of at least 5 to 1 and which is preferably of the order of 10 to 1 or more. The corrugation of the sheet is preferably continuous, i. e. in sine-wave form, as illustrated in Fig. 3. This corrugated sheet is utilized as a wing or other aircraft surface covering by applying it in such a way that the ridges and valleys of the corrugations extend parallel to the line of flight of the aircraft, as illustrated in Fig. 2.

The corrugations provided by my invention are of such low height and of such great pitch-to-height ratio that they do not materially increase the rigidity of the wing covering in which they are formed, nor do they materially increase the surface area in contact with the air.

It has been found that when a wing covered with sheet material constructed and applied as taught by this invention is subjected to forces which tend to produce the irregular and angularly disposed wave patterns described hereinbefore, the only effect is to increase the height of the preformed corrugations without producing any of the irregular or angularly disposed waves which have been found to be so objectionable. This effect is caused by the resistance of the corrugations to any deformation laterally or angularly thereof, whereby any force tending to produce such waves in the covering is resolved into forces tending only to produce the deepening of the valleys of the corrugated sheet, in the manner described. This increase of the height of the corrugations does not disturb the flow of air over the wing in any way.

It is well known that the forces causing the described irregular wave patterns in wing coverings, which are principally compressive and shear forces, are not distributed uniformly over the surfaces of the wings. For example, the compressive forces on a wing due to bending are greatest at the deepest part of the wing section and decrease toward the leading and trailing edges. The height of the corrugations provided by the invention may therefore be made proportional, at each part of the wing surface, to the magnitude of the forces at that part, and may therefore be made of least height at and adjacent the leading and trailing edges.

The ribs which provide internal support to the wing structure, and which extend approximately parallel to the direction of flight, are preferably spaced apart by an even multiple of the pitch of the corrugations provided by the invention in order to facilitate the attachment of the skin covering to such ribs.

I am well aware of the fact that corrugated coverings for wings and other parts of aircraft are very well known. These structures have been provided only for the purpose of increasing the strength and rigidity of the parts and therefore have failed to teach the art that the undesirable angular waves may be prevented by low corrugation. Further, the purpose and function of these known corrugations to produce strength and rigidity, required them to have a considerable height and a pitch, to height ratio of an order much smaller than permitted by my invention.

It is believed that my invention will be fully understood from the foregoing description. While I have described and illustrated only one form of my invention and the application thereof only to the wing of an aircraft, it will be apparent to those skilled in the art that other forms and applications, as well as modifications of those described, may be made without departing in any way from the spirit or scope of the invention, for the limits of which reference must be had to the appended claims.

What is claimed is:

1. An aircraft part, such as a wing, having a flexible metal skin sheet covering formed into sine-wave configuration by corrugations extending in the direction of flight and having a height of approximately 0.1 inch or less and a pitch-to-height ratio of at least 10 to 1.

2. An aircraft part, such as a wing, having a flexible metal skin sheet covering formed into sine-wave configuration by corrugations extending in the direction of flight and having a height of approximately 0.1 inch or less and a pitch-to-height ratio of at least 5 to 1.

FELIX NAGEL.

REFERENCES CITED

The following references are of record in the file of this patent:

UNITED STATES PATENTS

| Number | Name | Date |
| --- | --- | --- |
| 1,352,600 | Haskell | Sept. 14, 1920 |
| 1,553,695 | Junkers | Sept. 15, 1925 |
| 1,554,326 | Black | Sept. 22, 1925 |
| 1,773,280 | Scott | Aug. 19, 1930 |
| 1,835,312 | Lewis et al. | Dec. 8, 1931 |
| 1,883,552 | Chagniard et al. | Oct. 18, 1932 |
| 1,887,627 | Finger | Nov. 15, 1932 |
| 2,258,858 | Meadowcroft | Oct. 14, 1941 |